United States Patent [19]

Kozumplik, Jr.

[11] Patent Number: 5,108,270

[45] Date of Patent: Apr. 28, 1992

[54] CONDUCTIVE PLASTIC FLUID HANDLING EQUIPMENT

[75] Inventor: Nicholas Kozumplik, Jr., Bryan, Ohio

[73] Assignee: The Aro Corporation, Bryan, Ohio

[21] Appl. No.: 559,205

[22] Filed: Jul. 27, 1990

[51] Int. Cl.⁵ .............................................. F04B 21/00
[52] U.S. Cl. ................................. 417/393; 361/212; 361/215; 417/572; 417/DIG. 1
[58] Field of Search ....................... 361/212, 215, 220; 417/393, DIG. 1, 572

[56] References Cited

U.S. PATENT DOCUMENTS

| | | | |
|---|---|---|---|
| 3,713,280 | 1/1973 | Keller et al. | 361/220 X |
| 4,472,115 | 8/1984 | Rupp | 417/393 |
| 4,506,063 | 3/1985 | Sakurai et al. | 524/405 |

Primary Examiner—Leonard E. Smith
Attorney, Agent, or Firm—Walter C. Vliet

[57] ABSTRACT

A fluid handling apparatus having a casing constructed of a conductive corrosion resistant plastic material formed from acetal resin impregnated with conductive stainless steel wool. When grounded through use of a convenient bonding strap, the apparatus eliminates the buildup of electrostatic charge which may occur in combustible fluid transfer.

3 Claims, 2 Drawing Sheets

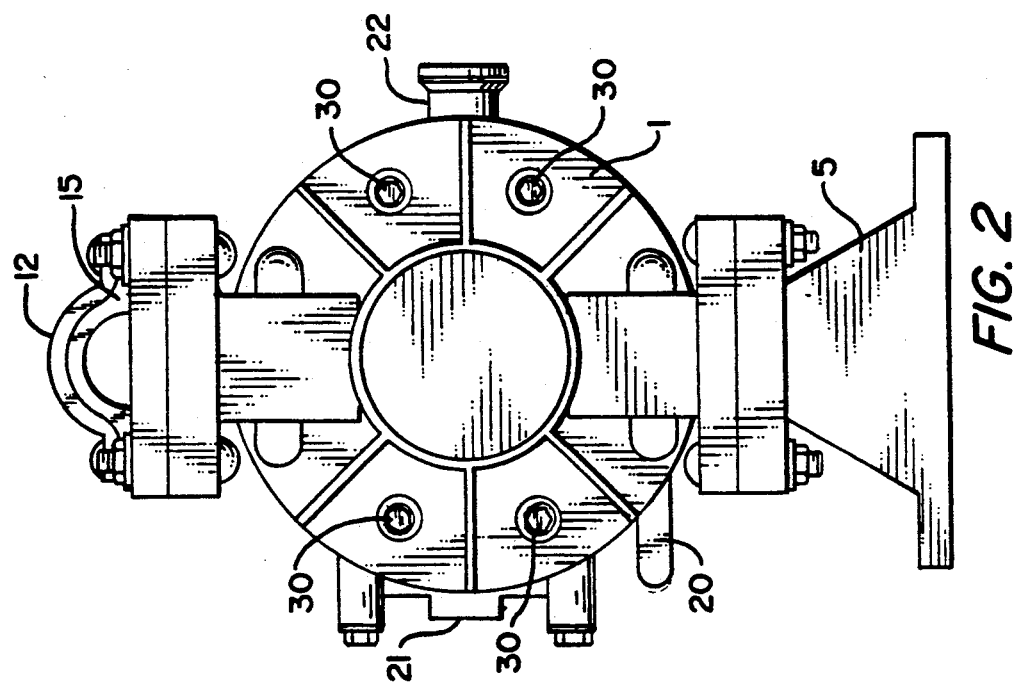
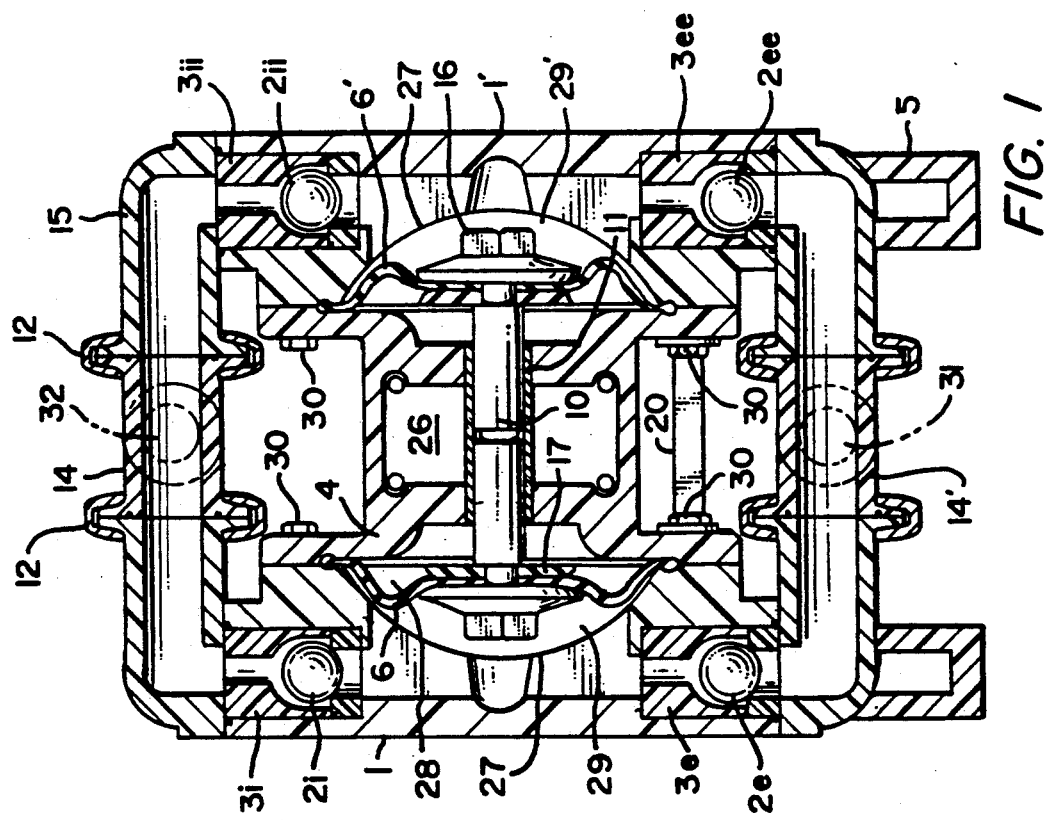

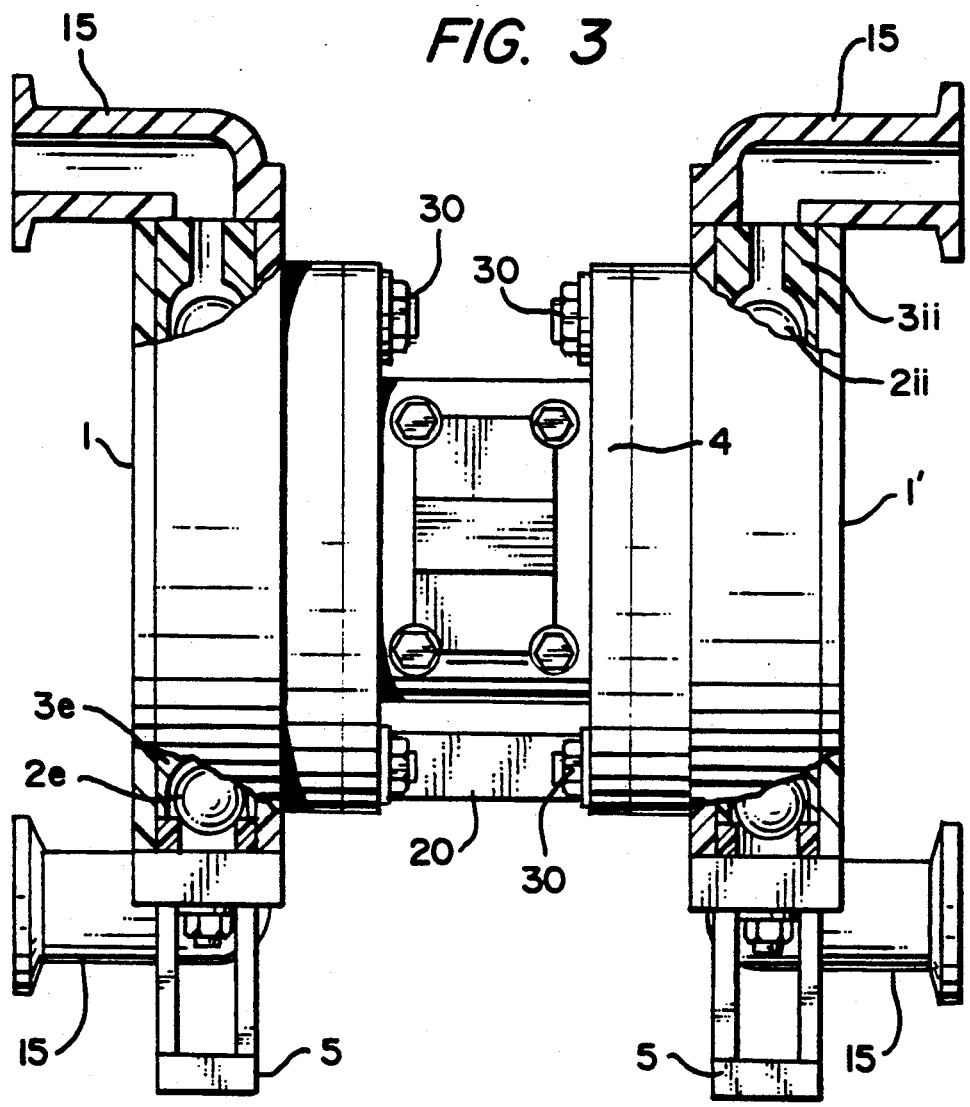

CONDUCTIVE PLASTIC FLUID HANDLING EQUIPMENT

BACKGROUND OF THE INVENTION

This invention relates generally to plastic fluid handling equipment such as plastic diaphragm pumps and more particularly to grounding of this equipment to prevent static discharge.

This invention is applicable to the various components in a fluid handling system including but not limited to pumps, valves, accumulators, nozzles, regulators, piping, etc. In particular, the current line of plastic diaphragm pumps and components available in the marketplace cannot be effectively grounded. As material flows through the system, static electricity is generated and accumulates on the metal components (especially fasteners) of the plastic diaphragm pumps and accessories. Independent lab testing has shown that sufficient energy can accumulate which could result in a static discharge. If the environment in which the pump is operating contains a flammable mixture of gases or dust, the discharge could ignite the atmosphere causing an explosion. Since the thermoplastic materials commonly used in plastic diaphragm pumps and components are nonconducting, the metal components cannot be grounded effectively without physically wiring them together. The wiring is time-consuming and the completed wiring subject to physical damage and corrosion which may negate the effective ground.

In one approach to this problem, plastic pumps have been developed and are on the market which are conductive, however, they have several limitations. In general, these pumps use heavy loadings of carbon black to obtain the desired conductivity. This has an adverse effect on the mechanical properties of the plastic and the carbon can leach into the fluid being pumped thereby contaminating the fluid.

In addition, the pumps in general are molded in polypropylene which is not compatible with materials such as, but not limited to, MEK, XYLENE, TOULENE, ACETONE, solvent based paints and stains. Polypropylene softens, swells and mechanical strength is lost when exposed to the above fluids.

The foregoing illustrates limitations known to exist in present conductive plastic pumps and pump systems. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a fluid handling component comprising a casing molded of a plastic material having conductive strands embedded therein, thereby rendering the casing conductive to electrostatic charge.

The foregoing and other aspects of the present invention will become apparent from the following detailed description of the invention when considered in conjunction with the accompanying drawing figures.

BRIEF DESCRIPTION OF THE DRAWINGS

FIG. 1 is a partially cross section side view illustrating a conductive plastic diaphragm pump according to an embodiment of the present invention showing the structure of a typical pump;

FIG. 2 is an end view illustrating an embodiment of a conductive plastic diaphragm pump; and FIG. 3 is a partially sectioned end view of a diaphragm pump illustrating an alternative embodiment of the present invention having dual inlet and outlet capability.

DETAILED DESCRIPTION

Referring to FIG. 1, a diaphragm pump according to the present invention is shown. The pump is comprised of a flanged hollow cylindrical body 4 having an interior exhaust chamber 26. Bolted on either end of the body are fluid end caps 1. The fluid end caps 1 cooperate with the body 4 to form a cavity 27. The fluid caps and the body are attached together and fastened by means of eight bolts 30, four of which are accessed from the exterior of the fluid caps and four of which are accessed through the flanged internal area of the body. A flexible diaphragm 6 divides the cavity 27 into two chambers, an interior chamber 28 and 28' and an exterior chamber 29 and 29'. A diaphragm rod 10 connects the diaphragm 6 and 6' and is free to reciprocate in a diaphragm rod sleeve 11 protruding through the body 4.

The exterior chambers 29 and 29' communicate through ball check valves 2 to an inlet manifold 5 and an exhaust manifold 15. The fluid to be pumped enters manifold 15 through inlet 31, is drawn into the exterior chamber 29 and 29' through one way check valves 2e and 2ee respectively by the reciprocating action of the diaphragm 6. Upon return stroke of the diaphragm 6' fluid is alternatively expelled through the one way check valves to i and to ii respectively and forced to exit the pump through outlet 32. The diaphragm rod and diaphragms, respectively 6 and 6', are reciprocated by the alternate application of compressed air or other fluid in the interior chambers 28 and 28' as well known in the art.

In the alternate embodiment shown in FIG. 3 each end of the pump is individually manifolded so that two different fluids may be pumped or a single fluid may be pumped in two stages.

According to the present invention the novel pump casing comprised of the fluid end caps 1 and 1", as well as the inlet and outlet manifold, are made from a novel conductive material formed by mixing stainless steel or other corrosion resistant metallic wool or stranded conductive fiber in a compounded and blended mixture of acetel resin, which is then injection molded or similarly molded by, for example, extrusion to form the various casing components. In particular, a 7 percent by weight addition of stainless steel fiber in a monopolymer acetal plastic has been found to be an economical and effective material for molding conductive plastic pump casing parts.

An additional feature of the present invention is the grounding strap 20 which couples the fluid caps 1 and 1' together to form an electrically bonded device. The ground strap 20 may form a convenient place for grounding the pump casing. In this matter a simple and economic means of grounding low cost plastic pumps is provided.

Having described the invention what is claimed is:

1. A fluid handling component comprised of a plurality of conductive plastic parts formed from homopolymer acetal resin having metallic conductive strands embedded therein, the improvement further comprising connecting bonding straps between said parts, said bonding straps further comprising a means for grounding said components.

2. A fluid handling component according to claim 1, wherein said component comprises a diaphragm pump.

3. A diaphragm pump for combustible corrosive liquids comprising:

a plastic pump housing formed of molded parts assembled together by means of fasteners;

said housing being manufactured from a homopolymer acetal resin having embedded therein conductive metal strands thereby rendering the housing conductive to electrostatic charge; and said pump housing is further provided with ground strap means interconnected between said pump housing components thereby forming a convenient means for grounding the pump structure.

* * * * *